United States Patent [19]

Hashimoto et al.

[11] Patent Number: 4,890,024

[45] Date of Patent: Dec. 26, 1989

[54] LOW-SPEED HIGH-TORQUE MOTOR

[75] Inventors: Ichiro Hashimoto; Kosho Ishizaki, both of Hitachi; Hiroshi Hayashida, Mito; Kunio Miyashita, Hitachi, all of Japan

[73] Assignee: Hitachi, Ltd., Tokyo, Japan

[21] Appl. No.: 184,120

[22] Filed: Apr. 21, 1988

[30] Foreign Application Priority Data

Apr. 24, 1987 [JP] Japan ................................ 62-99842

[51] Int. Cl.[4] ............................................ H02K 37/00
[52] U.S. Cl. .................................. 310/49 R; 310/185; 310/216; 310/254
[58] Field of Search ...................... 310/49 R, 179, 180, 310/184, 185, 198, 216, 254

[56] References Cited

U.S. PATENT DOCUMENTS

| 4,501,980 | 2/1985 | Welburn | 310/49 R |
| 4,638,195 | 1/1987 | Lin | 310/49 R |
| 4,687,961 | 8/1987 | Horber | 310/216 |

Primary Examiner—Patrick R. Salce
Assistant Examiner—Judson H. Jones
Attorney, Agent, or Firm—Antonelli, Terry & Wands

[57] ABSTRACT

A large number of teeth are formed on the outer circumference of a rotor. A stator is disposed around the rotor. The stator has multiple magnetic poles whose number is n times the number of phases. Each pole has formed on its surface a plurality of teeth at a pitch equal to the rotor tooth pitch. The teeth mounted on the adjacent magnetic poles are selected to deviate in pitch one-half or thereabout from the rotor teeth and the adjacent poles are to be opposite phases from each other.

2 Claims, 2 Drawing Sheets

LOW-SPEED HIGH-TORQUE MOTOR

FIELD OF THE INVENTION

The present invention relates to a motor and more specifically to a low-speed, high-torque motor with a small cogging torque.

BACKGROUND OF THE INVENTION

Low-speed, high-torque motors have a wide range of applications as direct drive (DD) motors no reduction gear interposed. One example of use is a source for driving the arm of a robot. The motor described in the Japanese Patent Laid-Open No. 63974/1984 published on April 11, 1984 in the title of "Motor for High-torque robot", also belongs to this field of art.

A motor of this kind has teeth on the rotor and stator and produces a very large torque by arranging the stator along the inner and outer circumferences of the rotor.

By referring to FIGS. 3 through 5, the low-speed high-torque motor structure will be explained below.

Designated 1 is a rotor which has a magnet 2 that is magnetized in the axial direction. The rotor 1 has at each end a yoke 3 which has teeth formed on its outer circumference.

The flux going out of the magnet 2, as shown by the arrow in FIG. 3, passes the yoke 3 and the gap between the rotor and the stator and enters the stator. It then passes through the gap again and the rotor yoke 3 on the other side and then returns to the magnet 2. Many teeth are formed on the outer circumference of the rotor and on the inner circumference of the stator. The rotor has 90 teeth at even pitches and the stator has 10 teeth in each magnetic pole. There are eight magnetic poles that are arranged at equal pitches. The rotor teeth are spaced 4 degrees from each other and the stator poles are arranged at 45-degree intervals with 10 teeth on each pole spaced 4 degrees from each other.

The gap between the rotor and the stator is made as small as 70 to 100 μm to increase the flux density.

Since in the prior low-speed high-torque motor in this field the gap between the rotor and the stator is made very small, a cogging torque results, producing variations in motor rotation. Unless the cogging torque is removed, a smooth rotation cannot be expected.

The cogging torque is variations in torque produced in the motor when the rotor in a deenergized state is rotated by external force. The cogging torque results from variations in magnetic flux which in turn are caused by variations in permeance of the gap between the rotor and the stator as the motor rotates. Factors that cause permeance variations include errors in the tooth pitch of the stator and rotor and in the tooth width, stator pole pitch errors, deviation of centers of the stator and the rotor, and deflection of the rotor in operation. The tooth pitch errors of the stator and the rotor, the tooth width errors and the stator pole pitch errors depend on the accuracy of the pressing patterns since these components are pressed in the patterns. There are few variations among individual components. The center deviation and deflection, however, are caused by factors involving the assembly process and there are variations in error among individual components. As mentioned above, since the gap in the motor of this type is very small, even a slight center deviation or deflection will result in greater torque variations than in other types of motors. In an experimental motor, the torque produced varies from 200 gf-cm to 600 gf-cm, the largest being three times as large as the smallest.

In the low-speed high-torque motor, even slight torque ripples and cogging torques present a problem. In addition, this type of motor has a problem of characteristic variations among individual motors.

When there is no center deviation or deflection, the magnetic flux variations in each pole are sinusoidal as shown in FIG. 2 if we neglect the tooth pitch error and hysteresis saturation of the core material. The two magnetic fluxes of opposing phases cancel each other making the total flux at every angle constant. However, the actual products have manufacturing errors and bearing clearances, so that the center deviation or deflection cannot be eliminated.

On the other hand, the permeance is not proportional to the gap difference because the flux extends not only from the opposing tooth surfaces but from the sides of the teeth. Therefore, in a motor with a center deviation and deflection, the flux variations of each phase differ from those of the other phase for both the DC and AC components, so that these fluxes cannot cancel each other producing a cogging torque. The amounts of center deviation and of deflection vary from one product to another and their directions (phase) also differ, making it impossible to cancel the flux variations by a controlling means. Thus, solving the above problem by structural improvements has been called for.

SUMMARY OF THE INVENTION

An object of the present invention is to provide a low-speed high-torque motor which is able to reduce the rotational variations at low speeds.

Taking advantage of the fact that in the above-mentioned ideal condition where there is no center deviation and deflection the magnetic flux can be made constant by canceling the flux variations between the magnetic poles of opposite phases, this invention arranges the windings on the adjacent poles in such a way as to make them opposite in phase to each other to reduce the permeance variations between the opposing phases, thus making it possible to reduce the cogging torque even when there is center deviation or deflection.

Two adjacent magnetic poles which are arranged opposite in phase to each other and which, because of their close positional relationship, are affected by the structural errors such as center deviation and deflection to the same degree have almost the same permeance variations and variation patterns that act upon the two poles. Since they are opposite in phase, the fluxes cancel each other suppressing the flux variations over the entire circumference of the air gap, which in turn reduces the cogging torque that results from the flux variations.

DETAILED DESCRIPTION OF THE PREFERRED EMBODIMENT

Figure 1:
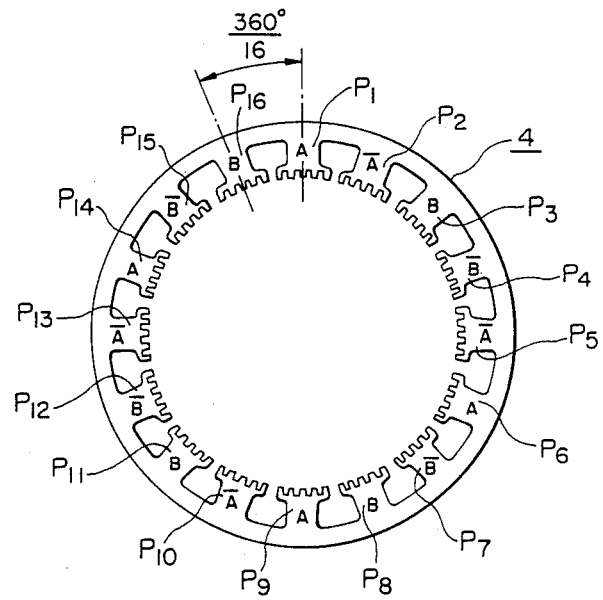
FIG. 1 is a front view of the stator, representing one embodiment of this invention.
Figure 5:
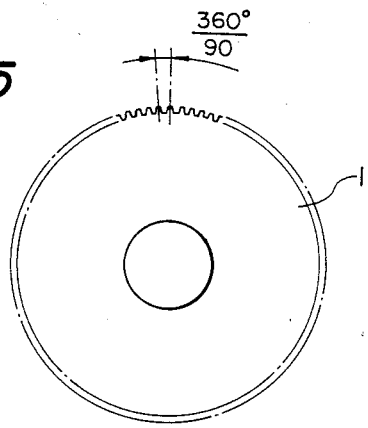
FIG. 5 is a front view of the rotor of this invention.

The stator of this invention that makes use of the aforementioned advantages is shown in FIG. 1. The rotor, as shown in FIG. 5, has 90 teeth on the outer circumference at equal four-degree pitches. The stator of FIG. 1 has a total of 16 magnetic poles in two phases as indicated by P1 through P16 with five teeth formed in each pole.

The pitch of the teeth on each stator pole is four degrees, equal to the rotor tooth pitch. It is noted, however, that the position of each stator pole (phase) relative to the rotor is slightly deviated and its relationship is shown in the table below.

The table shows the deviation angle between the teeth on the stator poles P2 through P16 and the rotor teeth with the teeth on the pole P1 are aligned with the rotor teeth.

| Pole No. | Deviation angle | Pole No. | Deviation angle | Pole No. | Deviation angle | Pole No. | Deviation angle |
|---|---|---|---|---|---|---|---|
| P1 | 0° | P5 | 2° | P9 | 0° | P13 | 2° |
| P2 | 2.5° | P6 | 0.5° | P10 | 2.5° | P14 | 0.5° |
| P3 | 1° | P7 | 3° | P11 | 1° | P15 | 3° |
| P4 | 3.5° | P8 | 1.5° | P12 | 3.5° | P16 | 1.5° |

Since the motor of this embodiment has two phases, if the pole P1 is taken as positive, the complete opposite phase is the poles P5 and P13 that have their teeth deviated from the rotor's by a half pitch or two degrees. In other words the latter two poles are 180 electrical degrees apart from the first pole P1.

Phase A and phase B are 90 electrical degrees apart (tooth deviation: 1° in mechanical angle) and the magnetic poles P1 through P16 assume either positive phase A or B or negative phase $\overline{A}$ or $\overline{B}$ as shown in FIG. 1.

For the poles with ±0.5° tooth deviations, they assume either a positive or a negative phase whichever is closer.

There are fractional angles of 0.5° and this results from the arrangement where the stator poles are spaced at equal pitches to eliminate the core directivity, improve work efficiency, and enhance the dimension accuracy of the slot area and slot opening.

The magnetic poles have the phase as shown in FIG. 1, and each pole has on one side an adjacent pole which is reverse in phase. Further, while in the conventional motor the angle between the positive and negative polarities is 90°, it is reduced to a very small angle of 22.5° with this embodiment.

When, for example, a center deviation of 20 μm exists in the direction of phase A, the conventional motor will have a gap difference of 20 μm between the phase A and the opposite phase $\overline{A}$. With this invention, however, it was found that this gap difference is reduced to 4.3 μm, about one-fifth the conventional gap difference.

This means the reduced flux variation between the positive and negative phases and therefore the reduced cogging torque.

According to the actually measured values, the cogging torque produced in this embodiment is 50 to 70 gf-cm, about ¼ to ⅓ the conventional value.

Although the above description deals with a motor of an inner rotor type, the same can also be said of an outer rotor type motor which falls under the technical scope of this invention.

Figure 2:
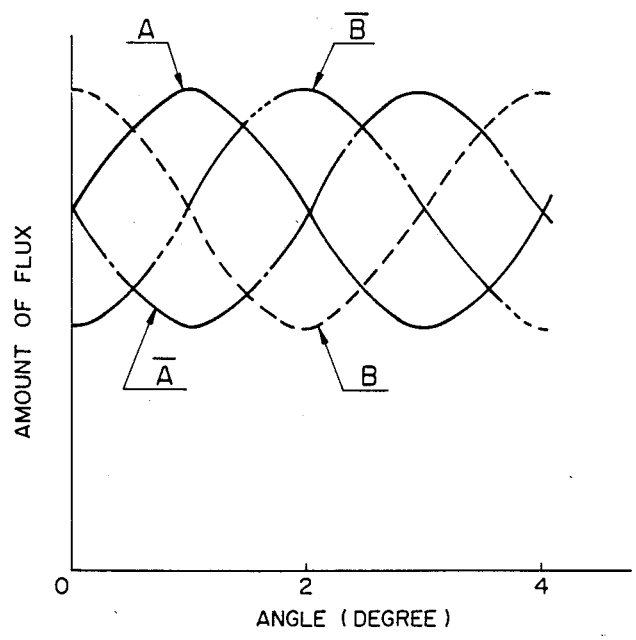
FIG. 2 is a diagram showing the relation between the mechanical angle and the magnetic flux.
Figure 3:
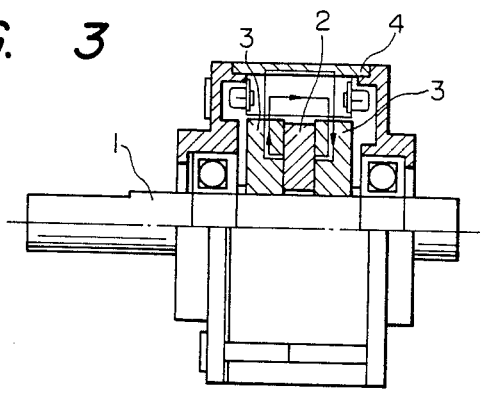
FIG. 3 is a half-sectioned view of a motor to which this invention applies.
Figure 4:
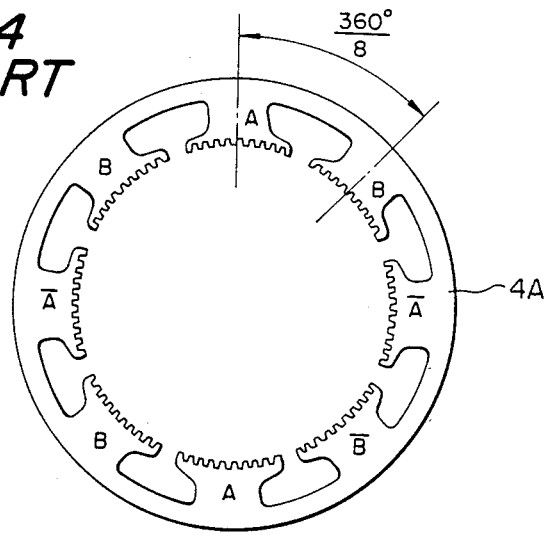
FIG. 4 is a front view of the conventional stator.

The low-speed high-torque motor of the present invention also attains the characteristic shown in FIG. 2.

While this invention describes the two-phase motor, it is apparent that the above method can also be applied to motors of three or more phases.

According to the invention, in a motor in which a rotor has many teeth formed on its outer circumference; and in which a stator disposed around the rotor has a plurality of magnetic poles, its number being n times the number of phases, each pole having formed on its surface a plurality of teeth at a pitch equal to the rotor tooth pitch; the magnetic poles are so arranged that the adjacent poles are reverse in phase to each other to significantly reduce the cogging torque. As a result a motor without a rotation speed variation can be obtained.

What is claimed is:

1. A hybrid type low-speed high-torque stepping motor comprising a rotor having a large number of teeth formed on an outer circumference thereof, and a stator disposed around the rotor and facing the teeth of the rotor, whose number is n times a number of phases, each pole having formed a plurality of teeth on a surface thereof at a pitch equal to the rotor tooth pitch, adjacent poles are wound by coils in opposite directions, respectively, and provide opposite phases, wherein each of the adjacent magnetic poles have teeth thereof deviated from the motor teeth by about one-half of the tooth pitch, the teeth on each pole being formed in a substantially identical configuration.

2. A low-speed high-torque motor according to claim 1, wherein the adjacent magnetic poles are arranged so that permeance variations between opposite phases are reduced and cogging torque of the motor is reduced.

* * * * *